Dec. 25, 1951   H. P. PHILLIPS   2,580,124
PISTON RING
Filed Feb. 19, 1948

INVENTOR.
Harold P. Phillips
BY
Attorney.

Patented Dec. 25, 1951

2,580,124

UNITED STATES PATENT OFFICE 2,580,124

PISTON RING

Harold P. Phillips, Hastings, Mich., assignor to Hastings Manufacturing Company, Hastings, Mich., a corporation of Michigan Application February 19, 1948, Serial No. 9,379

6 Claims. (Cl. 309—44)

This invention relates to improvements in piston rings.

The main objects of the invention are:

First, to provide a piston ring assembly characterized by a plurality of cylinder wall contacting sections each having independent movement of expansion and contraction in sealing engagement with a cylinder wall.

Second, to provide a piston ring assembly of the above type in which one of the sections is harder than the other section and is pressed radially outwardly against the cylinder wall with greater pressure than the other section.

Third, to provide a piston ring assembly adapted for initial quick wear-in particularly adapting the assembly for installation in worn cylinders.

Fourth, to provide a ring assembly which is highly efficient for the effective sealing or preventing blow-by and also highly efficient as an oil scraper ring.

Fifth, to provide a ring assembly having these advantages throughout a long life.

Further objects relating to details and economies will appear from the description to follow. The invention is defined in the claims.

A preferred embodiment of my invention is illustrated in the accompanying drawing, wherein.

Figure 1:
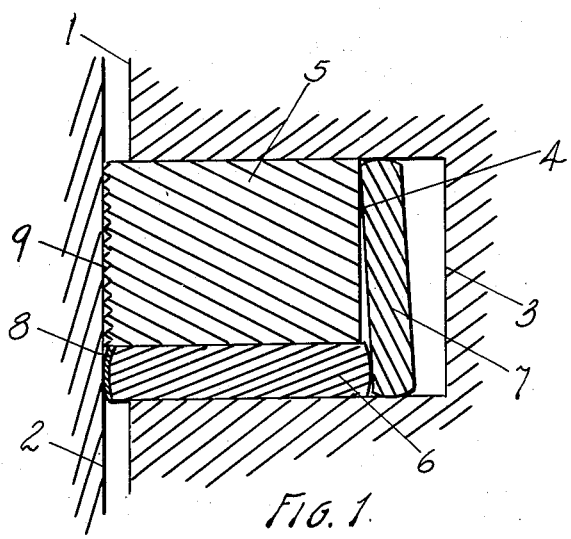
Fig. 1 is an enlarged fragmentary view in vertical section illustrating a ring assembly, in accordance with my invention, in operative relation to a piston and cylinder, and illustrating the parts at the time of installation and prior to the initial wearing in of the same.

No attempt is made to illustrate exact dimensions or dimensional relations of the parts or to illustrate working clearances.

Certain features of construction of the ring assembly herein disclosed are in common with those of the ring assembly disclosed in my Patent No. 2,313,395, dated March 9, 1943.

Referring to the drawings the numeral 1 designates a piston of an internal combustion engine which reciprocates in a cylinder 2 and is provided with an annular groove 3 receiving the piston ring assembly of my invention. This assembly designated generally by numeral 4 comprises an annular split cast-iron ring member 5, a thin split annular ribbon-like element 6, and an inner split, crimped expanding spring 7. The cast iron ring 5 is of generally rectangular section and the ribbon-like element 6 is disposed beneath the member 5 in the groove and is of greater radial dimensions than the member 5 so as to extend radially inwardly thereof, and the expander spring 7 is disposed radially inwardly of the members 5 and 6 and engages the inner peripheries thereof for radially expanding the members.

Figure 2:
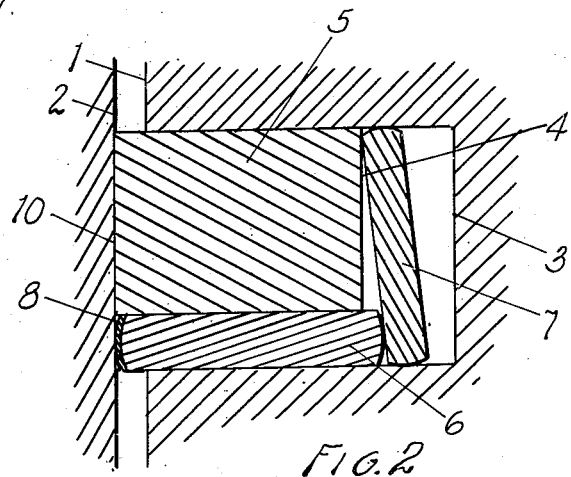
Fig. 2 is a view similar to Fig. 1 illustrating the parts after the initial wearing in of the same.

While the expander 7 is designated mainly to act on the element 6 there is a tendency for it to cant and stabilize as shown in Figs. 1, and 2. In this position it exerts some pressure on the element 5, which is considerable less than that exerted on the element 6.

The element 6 consists of a thin flat ribbon-like split annulus of steel formed of ribbon steel. The steels which have been employed in practical embodiments of the present invention had from .03 to .1 carbon content and preferably I employ a carbon content of at least .07%. The element 6 is plated or coated on its cylinder wall engaging surface with a layer 8 of chromium which is approximately from .001 to .006 of an inch in thickness. The total overall radial dimension of the ring element 6 including that of the chromium layer 8 is approximately from .002 to .007 of an inch greater than that of the cast iron element 5.

With reference to the axial dimensions of the component parts of the ring assembly described above, for a ring assembly having a total axial dimension of $\frac{1}{8}$ inch the corresponding dimension of the steel element 6 is approximately .030 of an inch and for a ring assembly having an overall axial dimension of $3/32$ the element 6 is approximately .020 of an inch. For other total axial dimensions of the ring assembly, the axial dimension of the steel element is in approximately the same ratio.

The chrome plating 8 almost entirely eliminates wear on the cylinder wall engaging edge of the lower steel element 6, therefore, by allowing the radially inward pressure of the expander 7 to be great on the steel element 6 and only light on the cast iron element 5 there is maintained throughout the life of the chrome plating a high pressure on the steel element 6 and a low pressure on the cast iron element 5, because the cast iron being only about ¼ as hard as the chrome edge 8 of the steel element 6 will naturally wear faster or fully as fast even though the pressure on it is relatively low.

The cylinder wall engaging surface of the cast iron element 5 is slightly roughened or serrated as indicated at 9 in Fig. 1. This facilitates quick wear-in, after which this cylinder wall engaging surface is smooth as shown at 10 in Fig. 2. The roughened surface 9 may be such as results from the thread turns caused by machining the cylinder wall engaging surface.

When the cylinder wall engaging surface of the cast iron element 5 is worn smooth as shown at 10 in Fig. 2, the pressure of the expander is approximately 25% on the cast iron element and 75% on the steel element 6 which is then maintained at substantially this ratio throughout the life of the plating. Before the roughened or serrated surface 9 of the cast iron element 5 is worn away the pressure on the element 5 is greater than 25% which facilitates quick wear in of the element 5.

In the embodiment of the invention illustrated the steel element 6 is the lower section and constitutes an oil scraper, and the cast iron element is the upper section and constitutes the compression ring.

The relatively high pressure on the steel element 6 and the relatively low pressure on the cast iron element 5 which is maintained throughout the life of the chrome plating 8 provides for a high degree of operating efficiency of the assembly as an oil scaper and as a compression ring throughout a long life of continued use.

Having thus described my invention, what I claim as new and desire to secure by Letters Patent, is:

1. A piston ring assembly comprising a relatively thick split expansible cast iron main ring element, a relatively thin split expansible ring element of ribbon steel, said ring elements having cylinder wall engaging surfaces, the cylinder wall engaging surface of the thin steel element being chrome plated and relatively hard as compared to the cylinder wall engaging surface of the cast iron element, the cast iron ring element being disposed above the thin steel ring element and functioning as a compression ring element, the thin steel ring element functioning as an oil scraper element, the radial thickness of the chrome plated steel element being greater than that of the cast iron element, an expander disposed to exert radial outward pressure on the inner peripheries of both said ring elements, the outward pressure exerted on the steel element bing substantially greater than that exerted on the cast iron element, the high degree of hardness of the chrome plated cylinder wall engaging surface of the thin steel element relative to the hardness of the cylinder wall engaging surface of the cast iron element maintaining radial wear on the thin steel element approximately equal to the radial wear on the thick cast iron element and maintaining the ratio of the greater pressure of the expander against the thin steel element to the lesser pressure of said expander against the thick cast iron element substantially constant throughout the life of the ring assembly.

2. A piston ring assembly comprising a relatively thick split expansible cast iron main ring element, a relatively thin split expansible ring element of ribbon steel, said ring elements having cylinder wall engaging surfaces, the cylinder wall engaging surface of the thin steel element being chrome plated and relatively hard as compared to the cylinder wall engaging surface of the cast iron element, the cast iron ring element being disposed above the thin steel ring element and functioning as a compression ring element, the thin steel ring element functioning as a oil scraper element, an expander disposed to exert radial outward pressure on the inner peripheries of both said ring elements, the outward pressure exerted on the steel element being substantially greater than that exerted on the cast iron element, the high degree of hardness of the chrome plated cylinder wall engaging surface of the thin steel element relative to the hardness of the cylinder wall engaging surface of the cast iron element maintaining radial wear on the thin steel element approximately equal to the radial wear on the thick cast iron element and maintaining the ratio of the greater pressure of the expander against the thin steel element to the lesser pressure of said expander against the thick cast iron element substantially constant throughout the life of the ring assembly.

3. A piston ring assembly comprising a relatively thick split expansible cast iron main ring element, a relatively thin split expansible ring element of ribbon steel, said ring elements having cylinder wall engaging surfaces, the cylinder wall engaging surface of the cast iron element being roughened to provide a quick wear-in surface, the cylinder wall engaging surface of the thin steel element being chrome plated and relatively much harder than the cylinder wall engaging surface of the cast iron element, the cast iron ring element being disposed above the thin steel ring element and functioning as a compression ring element, the thin steel ring element functioning as an oil scraper element, the radial thickness of the steel element being greater than that of the cast iron element, an expander spring canted to engage the inner peripheries of both ring elements to exert radially outward pressure thereon, the pressure of said expander spring after the quick wear-in surface of the cast iron element is worn-off being approximately 75% on the thin steel element and 25% on the cast iron element throughout substantially the life of said chrome plating.

4. A piston ring assembly comprising a relatively thick split expansible cast iron main ring element, a relatively thin split expansible ring element of ribbon steel, said ring elements having cylinder wall engaging surfaces, the cylinder wall engaging surface of the cast iron element being roughened to provide a quick wear-in surface, the cylinder wall engaging surface of the thin steel element being chrome plated and relatively much harder than the cylinder wall engaging surface of the cast iron element, said chrome plating being approximately from .001 to .006 of an inch in thickness, the radial thickness of the chrome plated steel element being approximately from .002 to .007 of an inch greater than that of the cast iron element, an expander spring canted to engage the inner peripheries of both said ring elements to exert radially outward pressures on both said ring elements, the pressure of said expander spring after the quick wear-in surface of the cast iron element is worn off being approximately 75% on the steel element and 25% on the cast iron element throughout the life of the chrome plating.

5. A piston ring assembly comprising an axially relatively thick split expansible main ring element, an axially relatively thin split expansible ring element, said ring elements having cylinder wall engaging surfaces, the cylinder wall engaging surface of the thin ring element being chrome plated and substantially harder than the cylinder wall engaging surface of the main ring element, expander means exerting a substantially greater radially outward pressure on the thin ring element than on the main ring element, the hardness of the chrome plated cylinder wall engaging surface of the thin ring element being such relative to that of the cylinder wall engaging surface of the main ring element that the ratio of the greater pressure of the expander against the thin ring element to the lessor pressure of the expander against the thick main ring element is approximately constant throughout the life of the ring assembly.

6. In a piston ring assembly, an axially relatively thick split expansible compression ring element, an axially relatively thin split expansible oil scraper ring element, each ring element having a cylinder wall engaging surface, the pressure per unit area of the thin oil scraper ring element against the cylinder wall being substantially greater than the pressure per unit area of the thick compression ring element against the cylinder wall, the cylinder wall engaging surface of the thin oil scraper ring element being chrome plated and substantially harder than the cylinder wall engaging surface of the thick compression ring element, whereby the radial wear on the oil scraper element is substantially equal to that on the thick compression ring element and whereby the ratio of the greater pressure per unit area of the scraper element against the cylinder wall to the lessor pressure per unit area of the compression ring element against the cylinder wall is approximately constant throughout the life of the ring assembly.

HAROLD P. PHILLIPS.

REFERENCES CITED

The following references are of record in the file of this patent:

UNITED STATES PATENTS

| Number | Name | Date |
| --- | --- | --- |
| 1,956,014 | Fink | Apr. 24, 1934 |
| 2,300,519 | Phillips | Nov. 3, 1942 |
| 2,313,395 | Phillips | Mar. 9, 1943 |

FOREIGN PATENTS

| Number | Country | Date |
| --- | --- | --- |
| 840,101 | France | Apr. 19, 1939 |

OTHER REFERENCES

"Recent Developments in Piston Rings for High Speed Diesels," Diesel Power & Transportation, page 650, August 1942. (Copy in Division 28, 309/44B.)